United States Patent Office 3,738,963
Patented June 12, 1973

3,738,963
PROCESS FOR THE PRODUCTION OF
POLYCARBONATES
Heinz Praetorius, Lendersdorf, and Axel Vogts, Eschweiler, Germany, assignors to Akzo N.V., Arnhem, Netherlands
No Drawing. Filed Sept. 14, 1971, Ser. No. 180,508
Claims priority, application Germany, Sept. 15, 1970,
P 20 45 443.7
Int. Cl. C08g *17/13*
U.S. Cl. 260—47 XA                                17 Claims

ABSTRACT OF THE DISCLOSURE

A process for the production of polycarbonates wherein a di- or polyvalent alcohol which is at least partly esterified with trichloroacetic acid is heated in the presence of a basic compound at about 60° C. to 200° C., chloroform being split off and removed from the reaction. The resulting polycarbonates are especially useful, eg. as foamed products.

---

It is generally known that polycarbonates can be obtained from dihydroxdiarylalkanes, especially 4,4′-dihydroxy-diphenyl alkanes such as bisphenol A, or from mixtures of these compounds with other aromatic or aliphatic dihydroxy compounds by reaction with phosgene in the presence of an acid acceptor, e.g. inorganic bases or tertiary amines. Another known process makes use of the transesterification of aromatic or aliphatic dihydroxy compounds, especially bisphenol A, with diesters of carbonic acid and especially diaryl carbonates such as diphenyl carbonate. These known processes are especially disadvantageous in requiring the use of phosgene which is quite poisonous. Thus, it is quite dangerous to prepare ploycarbonates in the prior art, whether proceeding according to the phosgenation process or according to the transesterification process in which the initial carbonic acid ester must also be obtained from phosgene.

The known preparation of polycarbonates has been described in great detail in the prior art, including such comprehensive references as H. Schnell, "Chemistry and Physics of Polycarbonates," Interscience Publishers, a division of John Wiley & Sons, New York (1964). Such references provide a detailed explanation of the utility of polycarbonates as well as a wide variety of useful initial reactants bearing two or more hydroxy groups, i.e. di- and polyvalent alcohols. This subject matter is therefore incorporated herein by reference as fully as if set forth in its entirety.

One object of the present invention is to provide a new and improved method for the production of polycarbonates which can be carried out without the use of phosgene at any stage, i.e. in the polymerization itself or in preparing initial reactants. Another object of the invention is to provide a process for the production of polycarbonates in which the desired polymer can be obtained almost quantitatively and in high quality. Still another object of the invention is to provide a new class of trichloracetic acid esters which are especially useful as the initial reactants for the process of the invention. Other objects and advantages will become more apparent from the following detailed disclosure.

It has now been found, in accordance with the invention, that polycarbonates can be produced with surprisingly good results and without using phosgene, by a process in which a partly or completely esterified di- or polyvalent alcohol, i.e. esterified with trichloracetic acid, is heated at an elevated temperature above about 60° C., e.g. up to about 200° C. and preferably in a range of about 80° C. to 140° C., and in the presence of a catalytic amount of a basic compound, if necessary with the addition of other di- and polyvalent alcohols which have not been esterified, preferably excluding 1,2-glycols, so as to split off chloroform in a polycondensation between hydroxy groups and trichloroacetic acid ester groups. The chloroform is removed from the reaction mixture, preferably by distillation.

The polycondensation reaction mixture according to the invention thus essentially includes a di- or polyhydric alcohol which has been at least partly esterified with the trichloroacetic acid. If only the completely esterified alcohol is employed as one component, it is essential of course to also provide a suitable addition of non-esterified di- or polyvalent alcohol, i.e. a condensable reactant which still contains at least two hydroxy groups. The partially esterified di- or polyvalent alcohols, e.g. the mono-trichloroacetic acid ester of a divalent alcohol, can be used alone in the reaction since the same compound can provide both the ester and hydroxy groups required for polycondensation.

The especially preferred partly or completely esterified reactants are those derived from divalent alcohols of the formula $$Cl_3C—CO—O—R—O—R'$$

in which R is preferably an aliphatic, cycloaliphatic, arylaliphatic or combined aliphatic-cycloaliphatic radical having a substantial hydrocarbon structure (e.g. which may be interrupted by an ether bridge or other substantially inert member of the molecule), and R' is either hydrogen or the trichloroacetyl radical —CO—CCl$_3$. The invention also provides essentially new compounds which are especially useful in the process and in achieving desirable polycarbonates wherein the above noted formula can be designated as $$Cl_3C—\underset{\underset{O}{\|}}{C}—O—A—O—B$$

in which B has the same meaning as R' while A indicates an alcohol selected from the class of e.g.

$$—CH_2CH_2CH_2CH_2—,$$
$$—CH_2CH_2CH_2CH_2CH_2CH_2—,$$

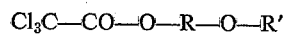

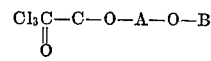, and

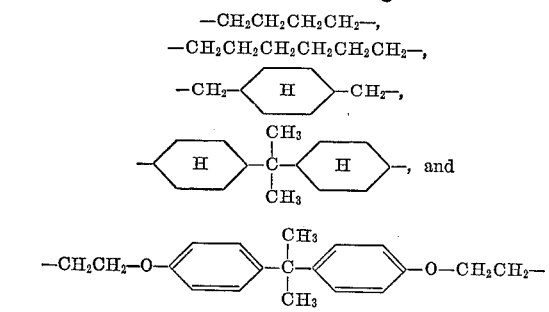

It is a particular advantage of the process of the invention that one can readily select many different alcohols with two or more hydroxy groups in the molecule in order to obtain the corresponding partly or completely esterified trichloroacetic acid ester derivatives. These alcohols are already known in the polycarbonate art, e.g. as listed in detail in the Schnell reference noted above, it being understood however that it is especially desirable to select those multivalent alcohols and especially divalent alcohols in which the hydroxy groups are not located on adjacent carbon atoms as in the 1,2-glycols. Esters formed with such hydroxy groups on the adjacent carbon atoms tend to form undesired cyclic carbonates.

Examples of suitable initial esters include the trichloroacetic acid esters of glycols such as propylene glycol, trimethylene glycol, 1,4-butane diol, pentamethylene glycol, hexamethylene glycol or the corresponding esters of the unsaturated glycols such as buten-2-diol-1,4 or butin-2-diol-1,4. One may also use the mono- or di-trichloro acetic acid esters of any number of other well known diols or polyols, including for example: cyclic diols such as cyclohexanediol or 1,4-dimethylolcyclohexane; the oxyethylated products of bisphenol A and perhydrobisphenol such as 2,2-bis-(4,4'-bisphenoxyethanol)-propane; and higher molecular weight dihydroxy-polyesters are obtained for example by reaction of lactones with glycols, aminoalcohols or diamines. Suitable esters also include those derived from polyhydric alcohols of three or more hydroxy groups, for example such compounds as glycerin (gylcerol), pentaerythritol, mannitol or the like as well as hexoses, di- or poly-saccharides including cellulose or starch, and also polyvinylalcohols. It is especially desirable to employ those trichloroacetic acid esters of alkylaromatic or aliphatic dihydroxy compounds which do not contain phenolic hydroxy groups. Very suitable esters are those of 1,4-dimethylolcyclohexane, the oxyethylated products of bisphenol A and 2,2-(4,4'-dihydroxy-diphenyl)-propane as well as perhydrobisphenols.

The completely esterified esters for use in the process of the invention can be obtained by known methods, for example by direct esterification with trichloroacetic acid or by a conventional transesterification of the lower alkyl esters, e.g. the methyl or ethyl esters, of trichloroacetic acid.

The di- or polyvalent alcohols which are partially esterified with trichloroacetic acid are compounds obtained by the same conventional processes but which contain in the same molecule both trichloroacetyl and also free hydroxy groups. As examples, especially suitable partial esters are the mono-esters of dihydric alcohols, e.g. the mono-trichloroacetic acid ester of the alcohols 1,4-butanediol, 1,6-hexanediol, 1,4-dimethylolcyclohexane, 2,2 - (bis - 4 - hydroxycyclohexyl) - propane and 2,2 - (4,4' - bisphenoxyethanol)-propane. Such partially esterified di- and polyvalent alcohols are also intended to include the mixtures obtained by the esterification of the individual alcohol or alcohols with an amount of trichloroacetic acid which is insufficient to achieve complete esterification. Such mixtures can also consist of the fully esterified product together with unreacted di- or polyvalent alcohol. Mixtures can also encompass corresponding alcohols in which the same molecule contains at least one trichloroacetyl group and at least one hydroxy group. The trichloroacetic acid esters claimed herein are valuable intermediates not only for producing polycarbonates but also in providing herbicides requiring a relatively high content of chlorine as furnished by the trichloroacetyl groups.

The process of the present invention is most advantageously carried out with the dihydric alcohols and their trichloroacetic acid mono- or di-esters, i.e. by using one or more compounds of the formula

wherein R has the same meaning specified above, preferably with at least 4 carbon atoms in a substantially hydrocarbon structure, while each R' is either hydrogen or the trichloroacetyl radical $Cl_3C$—$CO$—, with the proviso that there are approximately equal numbers of the terminal hydroxy and trichloroacetyl groups in the reaction mixture up to a slight excess of the hydroxy groups. These preferred reactants when used alone lead to highly linear polycarbonates, but cross-linked products can also be easily achieved by introducing one or more compounds with more than two functional groups, preferably in a minor amount compared to the difunctional compounds.

When using the fully esterified products as one essential component of the reaction mixture, it is thus necessary to introduce a di- or polyvalent alcohol, preferably one which is the same or very similar to that alcohol used for the fully esterified product. The glycols in which the hydroxy group are located on adjacent carbon atoms, however, are preferably excluded as reaction components in and of themselves, even though their trichloroacetic acid esters have been found to be useful. Again, the proportions of the completely esterified component and the unreacted alcohol component are chosen to provide one mol hydroxy group for each functional trichloroacetyl group or such that the hydroxy groups are present in slight excess.

The partially esterified products, on the other hand, where they contain approximately the same number of hydroxy and trichloroacetyl groups can be reacted alone as single compounds or as a mixture of similar di- or polyfunctional compounds so as to be self-condensed into the polycarbonate. In order to modify the polymer properties, the partially chloroacetylated products can be admixed with a certain amount of the di- or polyvalent alcohol, again so that the proportion of trichloroacetyl groups to hydroxy groups permits all of the trichloroacetyl groups to be transformed into carbonic acid esters.

One thus has a relatively wide selection of suitable compounds containing the trichloroacetyl and hydroxy functional groups which are polycondensed simply by heating in the presence of the basic compound as a catalyst, splitting off chloroform and forming a linear or cross-linked polymeric carbonic acid ester. The properties of the desired polycarbonate can be easily controlled in the same manner as in the production of such polycarbonates by known methods, i.e. by appropriate selection of the initial components or monomeric compounds as well as the control of molecular weight, cross-linking and the like by the kind or extent of polycondensation.

The reaction is best accomplished at atmospheric or only slightly elevated pressure and at an elevated temperature of at least about 60° C., i.e. above about 61.2° C. which is the boiling point of chloroform at atmospheric pressure. The upper temperature limit preferably does not exceed 200° C., and it is especially preferred to carry out the heating for polycondensation between about 80° C. and 140° C. to the extent that chloroform can also be distilled off in a vacuum or otherwise removed, e.g. with air stripping or expulsion with another suitably inert gas, it is also possible to work at even lower temperatures. The splitting off of the chloroform is a strongly exothermic reaction so that suitable cooling means are very desirable once the reaction is initiated.

As in known processes for the production of polycarbonates, many basic compounds are suitable in the reaction, and in the present case these act as a catalyst and are present in only small catalytic amounts. Generally one can use as little as about 0.01% up to as much as 5% by weight of the basic catalyst or even more, there being no advantage however in using excessive amounts which are apt to result in polymers of substantially lower molecular weights. Preferably, the basic compound is employed in an amount of about 0.1 to 1% by weight of the reaction components.

Suitable catalytic basic compounds are by way of example the oxides and hydroxides of metals of Groups I and II of the Periodic System of Elements, i.e. especially the alkali and alkaline earth metal oxides and hydroxides and also the alkali metal carbonates and alcoholates. Sodium and potassium basic compounds such as their oxides, hydroxides, carbonates and alcoholates, e.g. sodium hydroxide, sodium carbonate, potassium carbonate, sodium methylate and the like, are especially convenient and useful as the catalyst. However, one can also employ readily available organic bases, especially tertiary amines such as pyridine.

According to the process of the invention, one achieves polycarbonates with a molecular weight of about 4,000 to 6,000 when using completely esterified products and aliphatic alcohols as initial components, while molecular weights on the order of about 20,000 are achieved when using the same esterified products and cycloaliphatic alcohols. Polycarbonates obtained from the di- or polyvalent aliphatic alcohols partially esterified with trichloroacetic acid generally have molecular weights of around 2,500 while the corresponding partially esterified alcohols having an aromatic component yield polycarbonates with molecular weights on the order of about 15,000.

The polycarbonate products of the invention have a wide range of utility as taught for conventionally produced polycarbonates, and the present invention is most significant in providing a process which does not involve the use of phosgene at any stage and which otherwise permits a very broad selection of suitable polyfunctional alcohols to obtain final polycarbonate products having relatively high molecular weights and melting points, including both linear and cross-linked products. Highly porous or cellular foamed products are of particular value, these materials generally being obtained at the highest feasible temperatures by expelling carbon dioxide from the polycarbonate, i.e., in a self-expanding reaction of the molten polymer according to conventional procedures.

The invention is illustrated by the following examples, the first nine examples being directed to the preparation of certain mono- and bis-trichloroacetic acid esters as new initial materials. It will be appreciated that the mono-esters are relatively difficult to purify because they cannot be produced by a selective partial esterification of the available hydroxy groups. Therefore, it is preferable to simply use the mixture of an incompletely esterified dihydric or polyhydric alcohol for purposes of producing the polycarbonate according to the invention.

EXAMPLE 1

Butanediol-1,4-mono-trichloroacetic acid ester 90 grams (1 mol) butanediol-1,4, 164 grams (1 mol) trichloroacetic acid and 250 ml. of benzene were boiled in a stirring apparatus equipped with means of removing water for a period of time sufficient to separate 18 ml. of water. The benzene was separated to obtain a light yellow, clear liquid: Refractive index, $n_C^{20}=1.4780$; chlorine content = 46.2% (theoretical = 45.12%).

EXAMPLE 2

Butane-1,4-bis-trichloroacetic acid ester 90 grams (1 mol) butanediol-1,4 and 328 grams (2 mols) trichloroacetic acid were boiled together with 240 ml. benzene for a period of time sufficient to separate off 35 ml. of water. After separation of the benzene, there was obtained a light, somewhat turbid liquid with the refractive index $n_D^{20}=1.4908$ and a chlorine content of 57.1% (theoretical = 57.25%).

EXAMPLE 3

Hexanediol-1,6-mono-trichloroacetic acid 118 grams (1 mol) hexanediol-1,6 and 164 grams trichloroacetic acid were boiled with 240 ml. benzene with a water separator for a period of time sufficient to take off 18 ml. of water. After separating the benzene, there was obtained a viscous liquid with a refractive index of 1.4760 and a chlorine content of 40.7% (40.34%).

EXAMPLE 4

Hexanediol-1,6-bis-trichloroacetic acid ester 118 grams (1 mol) hexanediol-1,6, 328 grams (2 mols) trichloroacetic acid and 250 ml. of benzene were combined with each other and boiled up to the separation of 36 ml. of water in the water separator. After separating off the benzene, there was obtained a liquid with a refractive index of 1.4885 and a chlorine content of 52.4% (51.95%).

EXAMPLE 5

1,4-dimethylolcyclohexane-mono-trichloroacetic acid ester 146 grams (1 mol) 1,4-dimethylolcyclohexane having a cis:trans ratio of 30:70, 164 grams (1 mol) of trichloroacetic acid and 250 ml. of benzene were heated up to a separation of 18 ml. of water. The product consisted of a white paste which as a 20% benzene solution has a refractive index of 1.5019 and in pure form yields a chlorine content of 37.1% (theoretical = 36.47%).

EXAMPLE 6

1,4-dimethylolcyclohexane-bis-trichloroacetic acid ester

The same procedure was followed as in Example 5 but using twice the molar amount of trichloroacetic acid (328 grams). After boiling to separate off 36 ml. of water and then separating the benzene, there were obtained colorless crystals which had a melting point of 73–75° C. and a chlorine content of 49.5% (48.63%).

EXAMPLE 7

2,2-bis-(4-hydroxy-cyclohexyl)-propane-mono-trichloroacetic acid ester 240 grams (1 mol) of perhydrobisphenol, i.e. 2,2-bis(4-hydroxy-cyclohexyl)-propane, together with 164.5 grams (1 mol) of trichloroacetic acid and 250 ml. of benzene were boiled in the water separator until 18 ml. of water were expelled. There was obtained, after separating the benzene, a product which as a 20% solution in benzene exhibited a refractive index of 1.5039 and which had a chlorine content of 27.4% (27.59%).

EXAMPLE 8

2,2-bis-(4-hydroxy-cyclohexyl)-propane-bis-trichloroacetic acid ester

Following the same procedure as the preceding example but using twice the molar amount of trichloroacetic acid (328 grams), there was obtained after expelling 36 ml. and separating benzene a final product with a melting point of 152–155° C. and a chlorine content of 39.8% (40.03%).

EXAMPLE 9

2,2-(4,4'-bisphenoxyethanol)-propane-bis-trichloroacetic acid ester 158 grams (0.5 mol) of 2,2-(4,4'-bis-phenoxyethanol)-propane and 164 grams (1 mol) of trichloroacetic acid were boiled in a stirring vessel under reflux and provided with a water separator until 18 ml. of water had been expelled. As the inert solvent or liquid reaction medium, there was employed benzene or toluene. After separation of this solvent, there was obtained a yellow, oily product which slowly crystallized. The melting point is at 110° C., and the chlorine content amounted to 34.0%.

The process of the invention for the production of the polycarbonate was carried out as set forth below and summarized in the accompanying table which identifies the individual reactants, the catalysts used and the properties of the resulting polycarbonate products. In each instance, the procedure was as follows:

In a stirring vessel equipped with a thermometer, stirrer or mixing device and a cooler, all adapted to conduct the reaction at an elevated temperature while distilling off chloroform, there was added one-half gram mol of the ester as well as the catalyst and the reaction mixture was stirred up to complete solution, e.g. for approximately 15 minutes. In the case of the bis-trichloroacetic acid ester, an equimolar amount of the alcohol was also added and the resulting mixture stirred for about another 10 minutes. Finally, the reaction mixture was heated as rapidly as possible up to the reaction temperature, maintained between 100° C. and 130° C. In the case of the mono-trichloroacetic acid ester, the reaction mixture after the dissolution of the catalyst was likewise heated up to 100° C. to 130° C. Chloroform was continuously distilled off from the reaction mixture. At the end of the reaction, the resutling polycarbonate was obtained as a solid residue in the reaction vessel.

With increasing amounts of reactants, one must pay attention to the leading off of the heat of reaction in order to avoid discoloration of the polycarbonate due to local overheating of the contents of the vessel. This problem can in part be overcome by carrying out a so-called interfacial condensation in a conventional manner, i.e. in a suitable inert organic solvent such as benzene, toluene or the like.

compound is present in the reaction mixture in an amount of about 0.1 to 1% by weight.

| Ex. No. | Ester | Alcohol | Catalyst | Properties of the polycarbonate | | |
|---|---|---|---|---|---|---|
| | | | | M.P.(°C.) | Hydroxyl-number | Mol. wt. |
| 10 | Hexanediol-1,6-monotrichloroacetic acid ester | | 1,4-diazabicyclooctane | 50 | 22 | 2,500 |
| 11 | Hexanediol-1,6-bistrichloroacetic acid ester | Hexanediol | do | 50 | 22 | 2,500 |
| 12 | 1,4-dimethylolcyclohexane-mono-trichloroacetic acid ester | | $K_2CO_3$, 5 grams | 100 | 4.5 | 12,500 |
| 13 | 1,4-dimethylolcyclohexane-bis-trichloroacetic acid ester | 1,4-dimethylol-cyclohexane | do | 100 | 4.5 | 12,500 |
| 14 | 2,2-bis-(4-hydroxycyclohexyl)-propanemono-trichloroacetic acid ester | | $K_2CO_3$, 1.6 grams | 135–140 | 2 | 25,000 |
| 15 | 2,2-bis-(4-hydroxycyclohexyl)-propane-bis-trichloroacetic acid ester | Perhydro-bis-phenol | do | 135–140 | 2 | 25,000 |
| 16 | 2,2-(4,4-bis-phenoxyethanol)-propane-mono-trichloroacetic acid ester | | $K_2CO_3$, 5 grams | 145–150 | 2.8 | 20,000 |
| 17 | 2,2-(4,4-bis-phenoxyethanol)-propane-bis-trichloroacetic acid ester | 2,2-(4,4'-bis-phenoxy-ethanol) propane | do | 145–150 | 2.8 | [20,000 |

EXAMPLE 18

Crosslinked and foamed polycarbonate 68 grams (0.5 mol) of pentaerythritol and 196.8 grams (1.2 mol) trichloroacetic acid were dissolved in 250 ml. of benzene, and the resulting liquid boiled up to a separation of approximately 20 ml. of water. The benzene was volatilized off and the residue poured from the reaction vessel before it hardened.

10 grams of this residue were admixed with 0.5 gram $K_2CO_3$ and stirred in a glass beaker for a period of time until a homogeneous mass was obtained. This mass was then heated in a drying chamber which was maintained at a tempearture of approximately 200° C. After a short period of time, the splitting-off of chloroform sets in with a very vigorous foaming action. There is obtained a duroplastic polycarbonate foam, i.e. a highly crosslinked material, with a volume increase of 600%. A special characteristic of this soft, highly porous foam is its great adhesiveness on glass and its high elasticity. The foam is insoluble in ordinary solvents.

The invention is hereby claimed as follows:

1. A process for the production of a polycarbonate which comprises heating a partly esterified alcoholic reaction mixture consisting essentially of at least one di- or polyvalent alcohol other than a divalent glycol having hydroxy groups located on adjacent carbon atoms, there being at least one alcohol in said mixture which is sufficiently esterified with trichloroacetic acid in order to split off chloroform in a polycondensation between hydroxy groups and trichloracetic acid ester groups to form a polycarbonate, said heating being carried out at about 60° C. to 200° C. in the presence of a basic compound, and removing the split off chloroform from the reaction mixture.

2. A process as claimed in claim 1 wherein said heating is carried out at a temperature of about 80° C. to 140° C.

3. A process as claimed in claim 1 wherein said reaction mixture consists essentially of said di- or polyvalent alcohol completely esterified with said trichloroacetic acid and a non-esterified di- or polyvalent alcohol other than a divalent glycol in which the hydroxy groups are located on adjacent carbon atoms.

4. A process as claimed in claim 1 wherein one partially esterified alcohol alone is heated to split off chloroform.

5. A process as claimed in claim 1 wherein said basic compound is present in the reaction mixture in an amount of about 0.1 to 1% by weight.

6. A process as claimed in claim 1 wherein said chloroform is distilled off for removal from said reaction mixture.

7. A process as claimed in claim 1 wherein said esterified alcohol is selected from the class consisting of the mono- and di-trichloroacetic acid esters of diols containing from 4 to 19 carbon atoms in a substantially hydrocarbon structure.

8. A process as claimed in claim 7 wherein said esterified alcohol consists essentially of butanediol-1,4-mono-trichloroacetic acid ester.

9. A process as claimed in claim 7 wherein said esterified alcohol consists essentially of butanediol-1,4-bis-trichloroacetic acid ester.

10. A process as claimed in claim 7 wherein said esterified alcohol consists essentially of hexanediol-1,6-mono-trichloroacetic acid ester.

11. A process as claimed in claim 7 wherein said esterified alcohol consists essentially of hexanediol - 1,6-bis-trichloroacetic acid ester.

12. A process as claimed in claim 7 wherein said esterified alcohol consists essentially of 1,4-dimethylol-cyclohexane-mono-trichloroacetic acid ester.

13. A process as claimed in claim 7 wherein said esterified alcohol consists essentially of 1,4-dimethylol-cyclohexane-bis-trichloroacetic acid ester.

14. A process as claimed in claim 7 wherein said esterified alcohol consists essentially of 2,2 - bis-(4-hydroxy-cyclohexyl)-propane-mono-trichloroacetic acid ester.

15. A process as claimed in claim 7 wherein said esterified alcohol consists essentially of 2,2 - bis-(4-hydroxy-cyclohexyl)-propane-bis-trichloroacetic acid ester.

16. A process as claimed in claim 7 wherein said esterified alcohol consists essentially of 2,2-(4,4-bisphenoxyethanol)-propane-mono-trichloroacetic acid ester.

17. A process as claimed in claim 7 wherein said esterified alcohol consists essentially of 2,2-(4,4-bisphenoxyethanol)-propane-di-trichloroacetic acid ester.

References Cited

FOREIGN PATENTS 1,100,952   3/1961   Germany _____ 260—47

SAMUEL H. BLECH, Primary Examiner

U.S. Cl. X.R.

260—2.5 R, 77.5 D, 487; 71—106